United States Patent [19]
Loth

[11] Patent Number: 6,127,781
[45] Date of Patent: Oct. 3, 2000

[54] DEVICE FOR CONTROLLING THE OPERATION OF AT LEAST ONE FUNCTIONAL MEMBER OF A MOTOR VEHICLE

[75] Inventor: Siri Yuth Loth, Saint Brice Sous Foret, France

[73] Assignees: Automobiles, Peugeot, Paris; Automobiles Citroen, Sur Seine, both of France

[21] Appl. No.: 09/451,924

[22] Filed: Dec. 1, 1999

[30] Foreign Application Priority Data

Dec. 2, 1998 [FR] France .................................. 98 15235

[51] Int. Cl.[7] ................................................... H05B 37/00
[52] U.S. Cl. .......................... 315/82; 315/158; 307/10.8
[58] Field of Search ............................. 315/82, 149, 158; 307/10.8

[56] References Cited

U.S. PATENT DOCUMENTS 4,376,909  3/1983  Tagami et al. ............................. 315/82

Primary Examiner—David Vu
Attorney, Agent, or Firm—Pollock, Vande Sande & Amernick, R.L.L.P

[57] ABSTRACT

This device comprising a brightness sensor associated with analysis arrangement for controlling the operation of the member is characterized in that the analysis arrangement comprise arrangement (4) for periodically acquiring information about the instantaneous brightness at output from the sensor, arrangement (5) for calculating immediate brightness values by calculating the mean, over a first period of time, of the instantaneous brightness values, arrangement (6) for calculating immediate ambient brightness values by calculating the mean, over a second period of time, of the immediate brightness values, arrangement (7) for calculating natural ambient brightness values by calculating the mean of n first immediate ambient brightness values, over a third maximum period of time, and arrangement (8) for controlling the operation of the functional member on the basis of these natural ambient brightness values.

9 Claims, 1 Drawing Sheet

DEVICE FOR CONTROLLING THE OPERATION OF AT LEAST ONE FUNCTIONAL MEMBER OF A MOTOR VEHICLE

FIELD OF THE INVENTION

The present invention relates to a device for controlling the operation of at least one functional member of a motor vehicle, on the basis of information relating to the brightness in the latter's surroundings.

Already known in the prior art are devices of this type which comprise at least one brightness sensor associated with means of analysing output signals therefrom, so as to control the operation of a functional member.

Thus, for example, such devices are used in the prior art to control the switching on/off of the vehicle lights and to control the operation of means for ventilating/air-conditioning the vehicle cabin.

As a general rule, this operation is performed on the basis of information relating to the instantaneous brightness in the vehicle's surroundings.

It will however, be appreciated that the use of such a parameter has a certain number of drawbacks because it may result in unsuitable operation of the functional member.

The object of the invention is therefore to solve these problems.

SUMMARY OF THE INVENTION

To this end, the subject of the invention is a device for controlling the operation of at least one functional member of a motor vehicle, on the basis of information relating to the brightness in the latter's surroundings, comprising at least one brightness sensor associated with means of analysing output signals from this sensor so as to control the operation of the functional member, characterized in that the analysis means comprise:

means for periodically acquiring information about the instantaneous brightness at output from the sensor, means for calculating immediate brightness values by calculating the mean, over a first period of time, of the instantaneous brightness values which lie in a first range of determined variation, means for calculating immediate ambient brightness values by calculating the mean, over a second period of time, of the immediate brightness values which lie in a second range of determined variation, means for calculating natural ambient brightness values by calculating the mean of n first immediate ambient brightness values which lie in a third range of determined variation, over a third maximum period of time, and means for controlling the operation of the functional member on the basis of these natural ambient brightness values.

BRIEF DESCRIPTION OF THE DRAWINGS

The invention will be better understood with the aid of the description which will follow, which is given merely by way of example and made with reference to the appended drawings, in which.

DETAILED DESCRIPTION OF THE PREFERRED EMBODIMENTS

Figure 1:
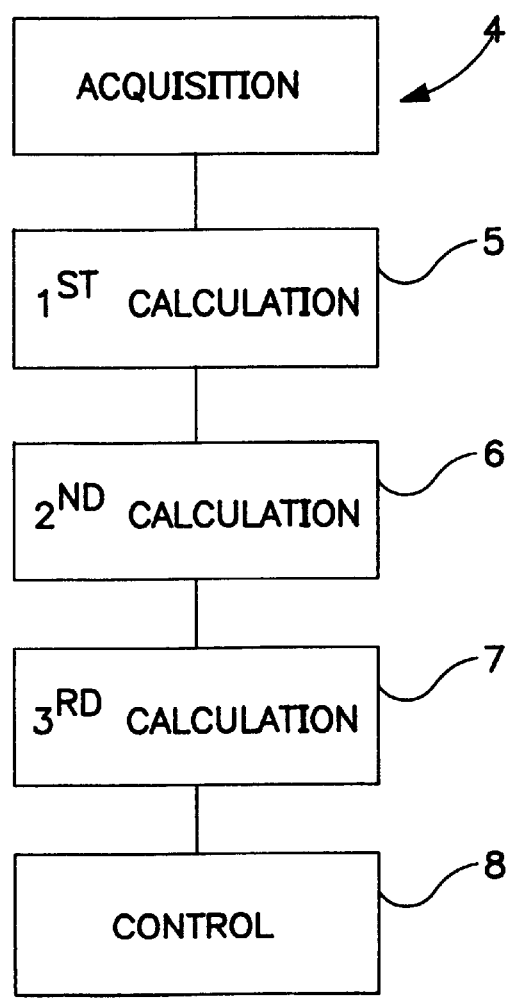
FIG. 1 depicts a block diagram illustrating the overall structure of an operating device according to the invention.

Specifically, FIG. 1 depicts a device for controlling the operation of at least one functional member of a motor vehicle, denoted by the general reference 1 in this figure, on the basis of information relating to the brightness in this vehicle's surroundings, comprising at least one brightness sensor denoted by the general reference 2, associated with means 3 of analysing the output signals from this sensor so as to control the operation of the functional member.

These analysis means 3 comprise, for example, a central information-processing unit designed to perform a certain number of information-acquisition functions and calculations of parameters so as to operate the functional member.

Figure 2:
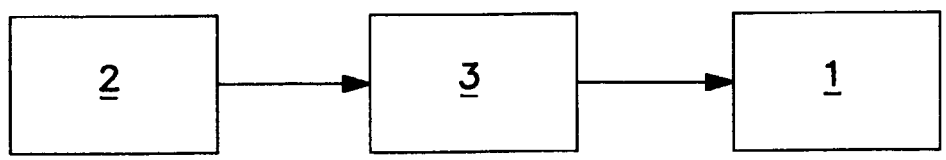
FIG. 2 depicts an example of a flow chart illustrating the operation of such a device.

The various means for fulfilling these various functions are illustrated in the form of blocks in FIG. 2.

Thus, for example, these analysis means comprise:

means 4 for periodically acquiring information about the instantaneous brightness at output from the sensor 2, for example every 200 ms, means 5 for calculating immediate brightness values by calculating the mean, over a first period of time equal to about one second, of the instantaneous brightness values which lie in a first range of determined variation equal, for example, to about 50 lux, means 6 for calculating immediate ambient brightness values by calculating the mean, over a second period of time equal to about three seconds, of the immediate brightness values which lie in a second range of determined variation equal, for example, to about 50 lux, means 7 for calculating natural ambient brightness values by calculating the mean of n first immediate ambient brightness values, n being equal, for example, to 10, which lie in a third range of determined variation equal, for example, to 50 lux, over a third maximum period of time equal, for example, to about 60 seconds, and means 8 for controlling the operation of the functional member on the basis of these natural ambient brightness values.

It is therefore appreciated that controlling the operation of the functional member on the basis of these natural ambient brightness values determined as explained previously allows the operation of this member to be optimized.

This functional member may, as already mentioned, consist of a vehicle ventilation/air-conditioning system or may consist of a system for automatically switching the vehicle lights on.

It of course goes without saying that still other embodiments of such a device may be envisaged.

What is claimed is:

1. Device for controlling the operating of at least one functional member of a motor vehicle, on the basis of information relating to the brightness in the latter's surroundings, comprising at least one brightness sensor (2) associated with means (3) for analysing output signals from this sensor so as to control the operation of the functional member (1), characterized in that the analysis means comprise:

means (4) for periodically acquiring information about the instantaneous brightness at output from the sensor (2), means (5) for calculating immediate brightness values by calculating the mean, over a first period of time, of the instantaneous brightness values which lie in a first range of determined variation, means (6) for calculating immediate ambient brightness values by calculating the mean, over a second period of time, of the immediate brightness values which lie in a second range of determined variation, means (7) for calculating natural ambient brightness values by calculating the mean of n first immediate ambient brightness values which lie in a third range of determined variation, over a third maximum period of time, and means (8) for controlling the operation of the functional member on the basis of these natural ambient brightness values.

2. Device according to claim 1, characterized in that the first, second and third ranges of determined variation are equal to 50 lux.

3. Device according to claim 1, characterized in that n is equal to 10.

4. Device according to claim 1, characterized in that the instantaneous brightness information is acquired about every 200 ms.

5. Device according to claim 1, characterized in that the first period of time is equal to about one second.

6. Device according to claim 1, characterized in that the second period of time is equal to about three seconds.

7. Device according to claim 1, characterized in that the third period of time is equal to about 60 seconds.

8. Device according to claim 1, characterized in that the functional member (1) is a vehicle ventilation/air-conditioning system.

9. Device according claim 1, characterized in that the functional member (1) is a system for automatically switching the vehicle lights on.

* * * * *